United States Patent
Kiefer et al.

(10) Patent No.: US 7,921,335 B2
(45) Date of Patent: Apr. 5, 2011

(54) SYSTEM DIAGNOSTIC UTILITY

(75) Inventors: Scott K. Kiefer, Parker, CO (US); Eric T. Burke, Highlands Ranch, CO (US); Michael E. Haws, Golden, CO (US)

(73) Assignee: The Boeing Company, Chicago, IL (US)

( * ) Notice: Subject to any disclaimer, the term of this patent is extended or adjusted under 35 U.S.C. 154(b) by 505 days.

(21) Appl. No.: 11/739,184

(22) Filed: Apr. 24, 2007

(65) Prior Publication Data

US 2008/0270837 A1    Oct. 30, 2008

(51) Int. Cl.
G06F 11/00    (2006.01)
(52) U.S. Cl. .............. 714/46; 714/25; 714/26; 714/38
(58) Field of Classification Search .......... 714/25, 714/26, 38, 46
See application file for complete search history.

(56) References Cited

U.S. PATENT DOCUMENTS

| | | | | |
|---|---|---|---|---|
| 5,671,351 A * | 9/1997 | Wild et al. | | 714/38 |
| 5,896,494 A * | 4/1999 | Perugini et al. | | 714/27 |
| 5,991,897 A * | 11/1999 | Perugini et al. | | 714/27 |
| 6,002,868 A * | 12/1999 | Jenkins et al. | | 717/105 |
| 6,279,123 B1 * | 8/2001 | Mulrooney | | 714/35 |
| 6,279,125 B1 * | 8/2001 | Klein | | 714/38 |
| 6,282,701 B1 * | 8/2001 | Wygodny et al. | | 717/125 |
| 6,697,969 B1 * | 2/2004 | Merriam | | 714/46 |
| 6,865,691 B1 * | 3/2005 | Brundridge et al. | | 714/25 |
| 6,883,118 B2 * | 4/2005 | Morgan et al. | | 714/43 |
| 6,999,990 B1 * | 2/2006 | Sullivan et al. | | 709/205 |
| 7,093,169 B2 * | 8/2006 | Merriam | | 714/47 |
| 7,159,151 B2 * | 1/2007 | Morgan et al. | | 714/43 |
| 7,222,255 B1 * | 5/2007 | Claessens et al. | | 714/4 |
| 7,237,014 B2 * | 6/2007 | Drummond, II | | 709/217 |
| 7,260,744 B2 * | 8/2007 | Wu | | 714/26 |
| 7,293,201 B2 * | 11/2007 | Ansari | | 714/38 |
| 7,305,466 B1 * | 12/2007 | Kaffine et al. | | 709/224 |
| 7,313,728 B2 * | 12/2007 | Rhea et al. | | 714/25 |
| 7,320,092 B2 * | 1/2008 | Morgan et al. | | 714/43 |
| 7,370,236 B2 * | 5/2008 | Szucs et al. | | 714/25 |
| 7,380,172 B2 * | 5/2008 | Srinivas et al. | | 714/38 |
| 2004/0010584 A1 * | 1/2004 | Peterson et al. | | 709/224 |
| 2004/0128585 A1 * | 7/2004 | Hind et al. | | 714/38 |
| 2004/0153792 A1 * | 8/2004 | Merriam | | 714/26 |
| 2005/0081111 A1 * | 4/2005 | Morgan et al. | | 714/38 |
| 2005/0097397 A1 * | 5/2005 | Wu | | 714/31 |
| 2005/0273667 A1 * | 12/2005 | Shrivastava et al. | | 714/38 |
| 2006/0230312 A1 * | 10/2006 | Nichols et al. | | 714/25 |
| 2006/0248389 A1 * | 11/2006 | Thaler et al. | | 714/26 |
| 2006/0282704 A1 * | 12/2006 | Morgan et al. | | 714/26 |
| 2007/0234127 A1 * | 10/2007 | Nguyen | | 714/38 |

(Continued)

*Primary Examiner* — Robert Beausoliel
*Assistant Examiner* — Joshua P Lottich
(74) *Attorney, Agent, or Firm* — Yee & Associates, P.C.; Steven Corey

(57) ABSTRACT

A computer implemented method, apparatus, and computer usable program code for performing diagnostic testing for an application executing on a computer. A diagnostic utility executes on the computer. The diagnostic utility includes a graphical user interface and a plurality of diagnostic functions. A selection of the application executing on the computer is received for diagnostic testing through the graphical user interface. Responsive to receiving the selection of the application, a set of diagnostic functions from the plurality of diagnostic functions is identified to test at least one of connectivity, operation of the application, and a presence of a set of needed files for the application to form a set of identified diagnostic functions. The set of identified diagnostic functions are identified using configuration information for the application. The set of identified diagnostic function are executed, wherein a result is generated. A result from executing the set of functions is presented using the graphical user interface.

14 Claims, 8 Drawing Sheets

U.S. PATENT DOCUMENTS

| | | | |
|---|---|---|---|
| 2008/0010523 A1* | 1/2008 | Mukherjee | 714/25 |
| 2008/0120521 A1* | 5/2008 | Poisson et al. | 714/26 |
| 2008/0162994 A1* | 7/2008 | Szucs et al. | 714/25 |
| 2008/0209267 A1* | 8/2008 | Xu et al. | 714/25 |
| 2008/0209269 A1* | 8/2008 | Brodie et al. | 714/26 |
| 2008/0307267 A1* | 12/2008 | Chandrasekaran | 714/38 |

* cited by examiner

SYSTEM DIAGNOSTIC UTILITY

BACKGROUND INFORMATION

1. Field

The present invention relates generally to an improved data processing system and in particular to a method and apparatus for processing data. Still more particularly, the present invention relates to a computer implemented method, apparatus, and computer usable program code for performing system diagnostics on a data processing system.

2. Background

Increasingly, applications for charting and navigation services, as well as flight planning, contain some type of Internet-based and/or communications port communication functionality. The installation of these types of applications typically provide a client side application used to access data and services at a host or server computer. This type of connectivity typically requires communication across a network, such as the Internet.

Further, many of these applications also may access peripherals through communications ports. For example, a charting or navigation service may access a global positioning system (GPS) unit connected to the client computer through a communications port. This type of capability provides a customer access to data needed to perform different diagnostic functions without requiring their client systems to carry the burden of processing or storing the data needed for these services.

With these types of applications, communication problems also have increased. These types of problems are varied and often depend on the configuration of the client computer or the local area network on which the client computer is located. The variable configuration includes, for example, different types of port access, firewalls, and communication port setups. With these types of varied configurations, communication issues often are difficult to reproduce and/or troubleshoot on a remote basis.

Currently, when an issue or problem is received, technical support personnel may attempt to troubleshoot the error encountered by the customer by walking the customer through different windows or screens in the application in an attempt to identify the problem and fix the problem. Depending on the operating system used by the customer, the type of Internet connection, the location of the client, and the other applications that may be running in the background on the customer's system, many different steps may be needed to determine the cause of the problem.

Further, these difficulties may be compounded depending on the customer's technical expertise. In many cases, allowing the technical personnel to setup a connection to the customer's system is infeasible because the customer is unable to connect to the Internet to access the services for data needed for their applications. In other cases, security concerns and configurations of firewalls and proxy servers make this option unavailable. As a result, remotely working with a customer through a telephone call to troubleshoot a problem with connectivity to the service provider is often time consuming and frustrating for the customer.

Another solution currently used to solve these problems is to send a technical expert to the customer's location to physically work on the customer's system to troubleshoot the problem. This type of process also is time consuming because the customer cannot operate the application until the technical expert travels to the customer site to work on the customer's system. Further, having to send technical support personnel to troubleshoot problems is an expensive proposition for the application provider.

SUMMARY

The different embodiments provide a computer implemented method, apparatus, and computer usable program code for performing diagnostic testing for an application executing on a computer. A diagnostic utility executes on the computer. The diagnostic utility includes a graphical user interface and a plurality of diagnostic functions. A selection of the application executing on the computer is received for diagnostic testing through the graphical user interface. Responsive to receiving the selection of the application, a set of diagnostic functions from the plurality of diagnostic functions is identified to test at least one of connectivity, operation of the application, and a presence of a set of needed files for the application to form a set of identified diagnostic functions. The set of identified diagnostic functions are identified using configuration information for the application. The set of identified diagnostic functions are executed, wherein a result is generated. A result from executing the set of diagnostic functions is presented using the graphical user interface.

In another embodiment, diagnostic testing is performed for the application. Responsive to receiving a selection of the application, a plurality of diagnostic functions is identified to perform using configuration information associated with the application to form identified diagnostic functions. The identified diagnostic functions are executed to test an ability of the application to properly function within an operating environment for the application.

In yet another embodiment, a computer program product on a computer usable medium is present for diagnostic testing for an application executing on a computer. Computer program code is executed on a diagnostic utility on the computer, wherein the diagnostic utility includes a graphical user interface and a plurality of diagnostic functions. Computer program code is present for receiving a selection of the application executing on the computer for diagnostic testing through the graphical user interface. In response to receiving the selection of the application, computer program code is used to identify a set of diagnostic functions from the plurality of diagnostic functions to test at least one of connectivity, operation of the application, and a presence of a set of needed files by the application to form a set of identified diagnostic functions. The set of identified diagnostic functions are identified using configuration information for the application. Computer program code is used to execute the set of identified diagnostic functions, wherein a result is generated and a result from executing the set of diagnostic functions is presented using the graphical user interface using a computer program code.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION

Figure 1:
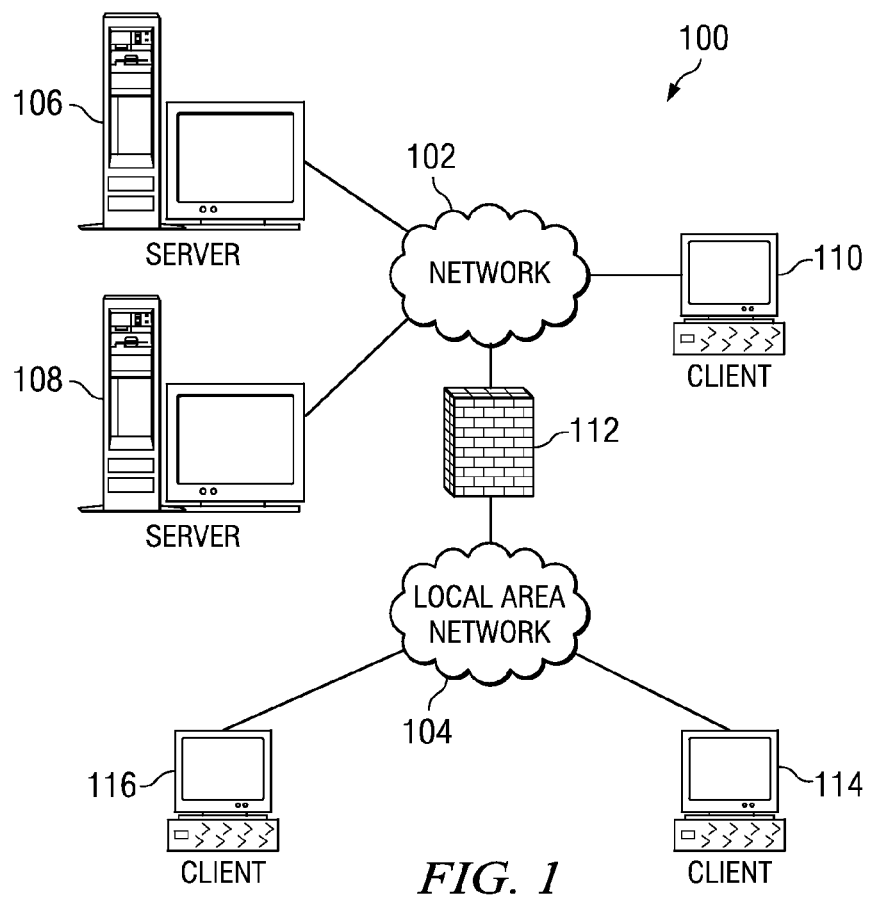
FIG. 1 is a pictorial representation of a network of data processing systems in which advantageous embodiments may be implemented.
Figure 2:
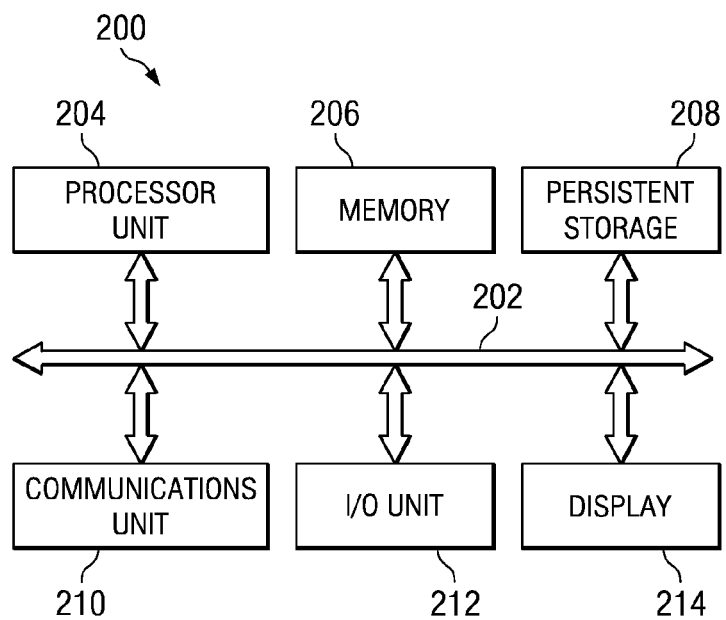
FIG. 2 is a diagram of a data processing system in accordance with an advantageous embodiment of the present invention.

With reference now to the figures and in particular with reference to FIGS. 1-2, exemplary diagrams of data processing system environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

Turning now to FIG. 1, a pictorial representation of a network of data processing systems is depicted in which advantageous embodiments may be implemented. Network data processing system 100 is a network of computers in which the different illustrative embodiments may be implemented. In this example, network data processing system 100 contains network 102 and local area network (LAN) 104. These networks are the medium that provide communications links between various devices and computers connected together within network data processing system 100. Network 102 and local area network 104 may include different types of communications, such as wired, wireless communications links, or fiber optic cables.

In the depicted example, server 106 and server 108 connect to network 102. Client 110 also connects to network 102. In this example, local area network 104 connects to network 102 through the use of firewall 112. Firewall 112 is a security device that may be configured to permit, deny, or proxy data connections set and configured through a securing policy. Firewall 112 provides protection to local area network 104 in these examples. Firewall 112 may be a software component, a hardware device, or a combination of the two. In these examples, client 114 and client 116 connect to local area network 104. Clients 110, 114, and 116 may be, for example, personal computers, network computers, or some other computing device.

In these examples, server 106 and server 108 may provide data to clients 110, 114, and 116. In particular, in these illustrative examples, server 106 and server 108 provide data and services to clients 110, 114, and 116. This data may be, for example, data for flight planning and data for charting and navigation. Additionally, the services may be those relating to flight planning and charting and navigation. Of course, these servers also may provide other types of services and data, depending on the particular implementations.

Clients 110, 114, and 116 may have client applications that receive and access the data and services on servers 106 and 108. In these examples, firewall 112 may limit the access to network 102 for clients 114 and 116 depending on the particular security rules in place. As a result, in some cases, clients 114 and 116 may be unable to access network 102 or access certain services, such as those on servers 106 and 108 on network 102.

The different illustrative embodiments provide a computer implemented method, apparatus, and computer usable program code for performing system diagnostics on clients, such as clients 110, 114, and 116 when these clients are unable to execute applications that require services or data located on computers, such as server 106 and server 108. These applications are unable to function properly because they may not have access to needed data. Further, these applications may not have the correct files needed to function properly in its operating environment. The diagnostic utility or system in the different advantageous embodiments allow for more efficient troubleshooting without requiring sending a service technician or other expert to the location of these clients.

In the depicted examples, network 102 is the Internet and represents a world-wide collection of networks and gateways that use the transmission control protocol/Internet protocol (TCP/IP) suite of protocols to communicate with each other. Of course, network 102 may be implemented using other types of networks, such as, for example, an intranet, a local area network, or a wide area network (WAN). FIG. 1 is intended as an example and not as an architectural limitation for the different illustrative embodiments.

Turning now to FIG. 2, a diagram of a data processing system is depicted in accordance with an advantageous embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. Memory 206 in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

The different embodiments provide a computer implemented method, apparatus, and computer usable program code for performing diagnostic testing for an application executing on a computer. A diagnostic utility executes on the computer. The diagnostic utility includes a graphical user interface and a plurality of diagnostic functions. A selection of the application executing on the computer is received for diagnostic testing through the graphical user interface. Responsive to receiving the selection of the application, a set of diagnostic functions from the plurality of diagnostic functions is identified to test at least one of connectivity, operation of the application, and a presence of a set of needed files for the application to form a set of identified diagnostic functions, wherein the set of identified diagnostic functions are identified using configuration information for the application.

Testing at least one of connectivity, operation of the application, and a presence of a set of needed files for the application means that the identified diagnostic functions may test just connectivity, operation of the application, or a presence of a set of needed files by the application. Testing at least one also may be a combination of some or all of connectivity, operation of the application, or a presence of a set of needed files by the application. The set of identified diagnostic functions are executed, wherein a result is generated. A result from executing the set of functions is presented using the graphical user interface.

In these examples, a set of needed files are any files that are required by an application to function properly. An example of a needed file is a dynamic link library or a data file. An application functions properly when the application is able access data and/or services needed to provide an accurate result. For example an accurate result in planning a route for a vessel occurs if the application is able access global positioning data needed to determine a current position of the vessel. Another example is an accurate result in the form of a flight plan that avoids bad weather is generated by an application if the application is able to access current weather data from a remote server.

Figure 3:
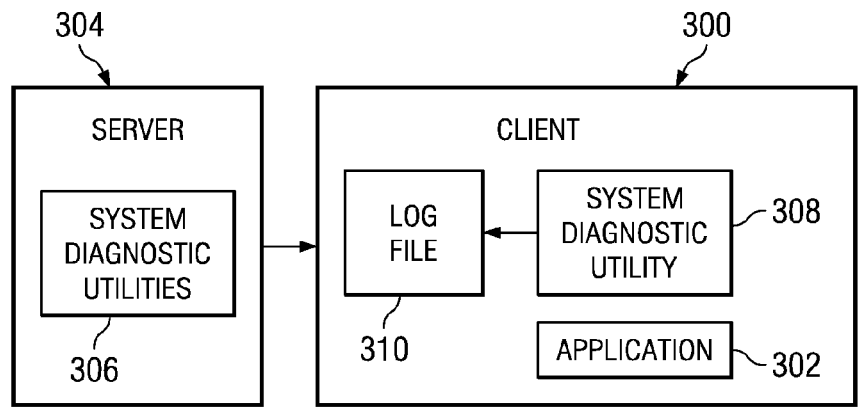
FIG. 3 is a diagram illustrating the use of a diagnostic system utility in accordance with an advantageous embodiment of the present invention.

Turning now to FIG. 3, a diagram illustrating the use of a diagnostic system utility is depicted in accordance with an advantageous embodiment of the present invention. In this example, client 300 is an example of a client computer, such as client 110 or client 114 in FIG. 1. In this particular example, client 300 executes application 302, which is unable to provide the functionality intended for application 302.

The inability of application 302 to function as intended may be, for example, the result of connection problems to a server, the Internet, or an inability to access peripheral devices connected through a communications port. Application 302 is unable to function properly within its operating environment. Further, application 302 also may be unable to function because of an installation problem or problems in the installation code. In some cases, application 302 may function, but may provide incorrect results based on an inability to obtain up-to-date data.

When a customer at client 300 contacts technical support, the service representative may talk the customer through the process needed to download a utility from system diagnostic utilities 306. After installation of system diagnostic utility 308 occurs on client 300, the service representative is able to visually as well as verbally instruct the customer through the resolution of multiple issues using system diagnostic utility 308. Further, in some cases, customers also may choose to troubleshoot issues on their own, using system diagnostic utility 308 as a starting point.

In this example, client 300 contacts server 304 to retrieve a utility from system diagnostic utilities 306. In response, system diagnostic utility 308 is loaded onto client 300. The customer may select a link on a web page to retrieve or download system diagnostic utility 308. Alternatively, if no Internet or network connections are present or possible, system diagnostic utility 308 may be loaded onto client 300 through another mechanism, such as a compact disk or flash memory unit. In yet another environment, the diagnostic utility together with the application configuration files may be preloaded onto a system.

The customer at client 300 may then execute system diagnostic utility 308 to perform different diagnostic functions to identify a potential cause of the problem with application 302. The cause of the problem may be as simple as requiring one or more ports to be opened on a firewall.

In these examples, the tests provided through diagnostic functions in system diagnostic utility 308 may include, for example, testing TCP/IP connection for application 302 over specific ports and IP addresses to the servers to which application 302 is to connect. A diagnostic function is a function, code, or program that is used to determine whether a set of parameters needed by an application to properly operate is correct. This set of parameters may be one or more parameters. These parameters include, for example, ports in a firewall and communications ports. The application may need access to certain ports in a firewall to be able to connect to a server to access data and/or services on that server. The communications ports may be needed to access a device, such as a global positioning system device to obtain location data. The diagnostic functions also may include identifying the ability of client 300 to access individual universal resource locators and ports.

System diagnostic utility 308 also may provide access to common diagnostic utilities bundled with the operating system, such as netstat, ping, cmd, control panel, and device manager. These diagnostic utilities are examples of utilities provided with different Windows operating systems available from Microsoft Corporation.

System diagnostic utility 308 also may be configured to allow for communication through a proxy server, test for data streams on com ports at different rates, and verify the validity of data, such as National Marine Electronics Association (NMEA) data for global positioning system communications. NMEA is a standard protocol used by global positioning system receivers to transmit data. Further, system diagnostic utility 308 may perform integrity checks of application 302.

These are illustrative examples of some diagnostic functions that may be provided by system diagnostic utility 308. The particular diagnostic functions provided depend on the particular implementation and application involved.

System diagnostic utility 308 may then generate a report, such as log file 310. This log file identifies the different diagnostic functions performed during the diagnostic process as well as the results. Additionally, log file 310 also may include suggested changes needed to allow application 302 to function properly.

Log file 310 may be used by an information technology person located at the customer site to perform changes needed to provide connectivity if, for example, ports needed to communicate with the server are not open. Also, log file 310 may be sent back to the provider for analysis, depending on the sophistication of the customer with respect to information technology issues. Additionally, log file 310 may be used by a representative at the provider to discuss changes or fixes needed by a customer. Log file 310 is especially helpful in this situation because both the customer and service representative are able to view the same data and results to determine what changes may be needed to allow application 302 to access data and/or services on a server. Log file 310 can be printed, stored in a local file, database or transmitted via a network or wireless method to a remote logging system.

Figure 4:
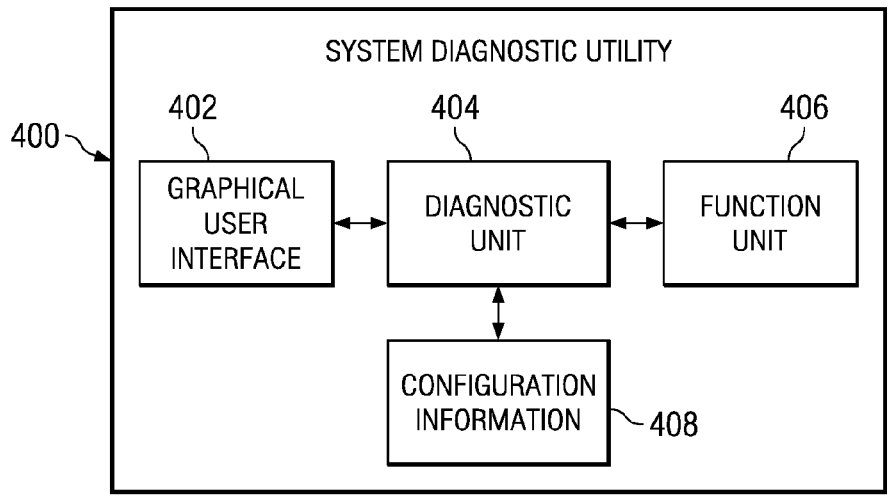
FIG. 4 is a diagram of a system diagnostic utility in accordance with an advantageous embodiment of the present invention.

With reference now to FIG. 4, a diagram of a system diagnostic utility is depicted in accordance with an advantageous embodiment of the present invention. In this example, system diagnostic utility 400 is an example of a system diagnostic utility within system diagnostic utilities 306 in FIG. 3. System diagnostic utility 400 includes graphic user interface 402, diagnostic unit 404 and function unit 406. Additionally, system diagnostic utility 400 also includes configuration information 408. The configuration information may be located in one or more data structures, but not limited to part of an application's registry entry, an initialization file, or an XML formatted file provided with the application. These different blocks are illustrated as functional blocks and are not intended as architectural limitations to a manner in which system diagnostic utility 400 may be structured or implemented.

Graphical user interface 402 provides a user interface that allows a customer to easily access different diagnostic functions provided by function unit 406. Graphical user interface 402 is intended to allow users with little or no knowledge about computers and information technology matters to run diagnostics needed to troubleshoot an application. In these examples, graphical user interface 402 may provide a list of applications that may be selected for troubleshooting. Additionally, graphical user interface 402 also may provide a customer an ability to select a particular diagnostic function for execution. With graphical user interface 402, the customer is not required to have any knowledge of disk operating system (DOS) based commands or other interfaces that may be required for running different diagnostic functions.

Diagnostic unit 404 executes the different diagnostic functions within function unit 406 to identify issues with an application attempting to connect to a server. Configuration information 408 contains information needed to perform diagnostics for a particular application. For example, one application may require one set of ports for access while another application may require a different set of ports. In these illustrative examples, configuration information 408 also may specify which diagnostic functions are to be used in diagnosing problems with an application.

As an example, one application may include a global positioning system unit that is attached to the computer, while another does not require a global positioning unit or other device. As a result, the configuration file specifies that the first application includes using a diagnostic function to test the communications ports. On the other hand, the configuration file does not include such a function for the second application because no devices are attached to the communications ports.

Function unit 406 in these examples is a library of diagnostic functions that may be executed by diagnostic unit 404. These diagnostic functions include, for example, testing for an ability of an application to generate connections over different ports and IP addresses, testing for an ability to access individual universal resource locators and ports, providing access to other diagnostic utilities, setting up a proxy server, testing for data streams on different communications ports at different data rates, validating data for global positioning system communications, and performing integrity checks on the installation of an application.

Figure 5:
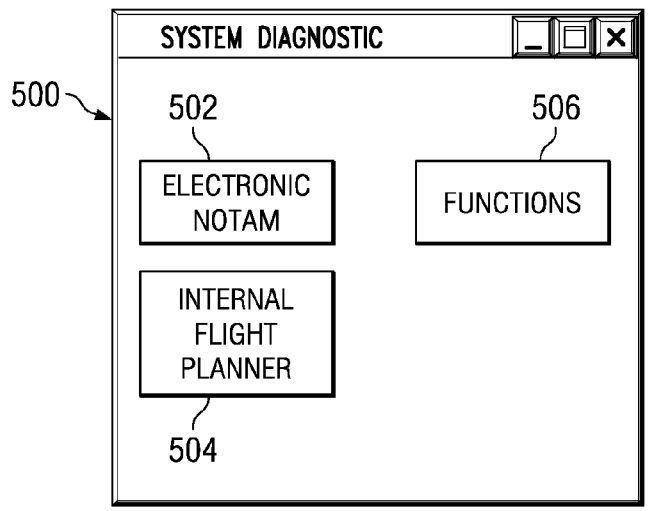
FIG. 5 is a diagram of a graphical user interface in accordance with an advantageous embodiment of the present invention.

Turning now to FIG. 5, a diagram of a graphical user interface is depicted in accordance with an advantageous embodiment of the present invention. In this example, window 500 is an example of a graphic user interface presented by graphical user interface 402 in FIG. 4. In this example, window 500 presents a customer with an ability to select applications for diagnostic testing. Electronic Notice To Airmen (NOTAM) 502 and Internet flight planner 504 are controls to activate diagnostic functions to test these two types of applications. The selection of one of these controls for the appropriate application initiates a set of tests for the selected application. This set of tests may be one or more tests provided by the function unit in the system diagnostic utility. The tests run and the parameters used for the test depends on the application selected. Application specific information is obtained from a configuration file, such as configuration information 408 in FIG. 4.

Additionally, a customer may select specific diagnostic functions for use in testing the application. This selection of diagnostic functions may be accessed through functions 506. This control allows a customer that has some knowledge about software and computers to perform specific tests. For example, a customer may realize that the application is unable to reach the Internet and may select functions 506 to perform a particular function to test whether the application can generate connections or access specific ports.

Figures 6, 7:
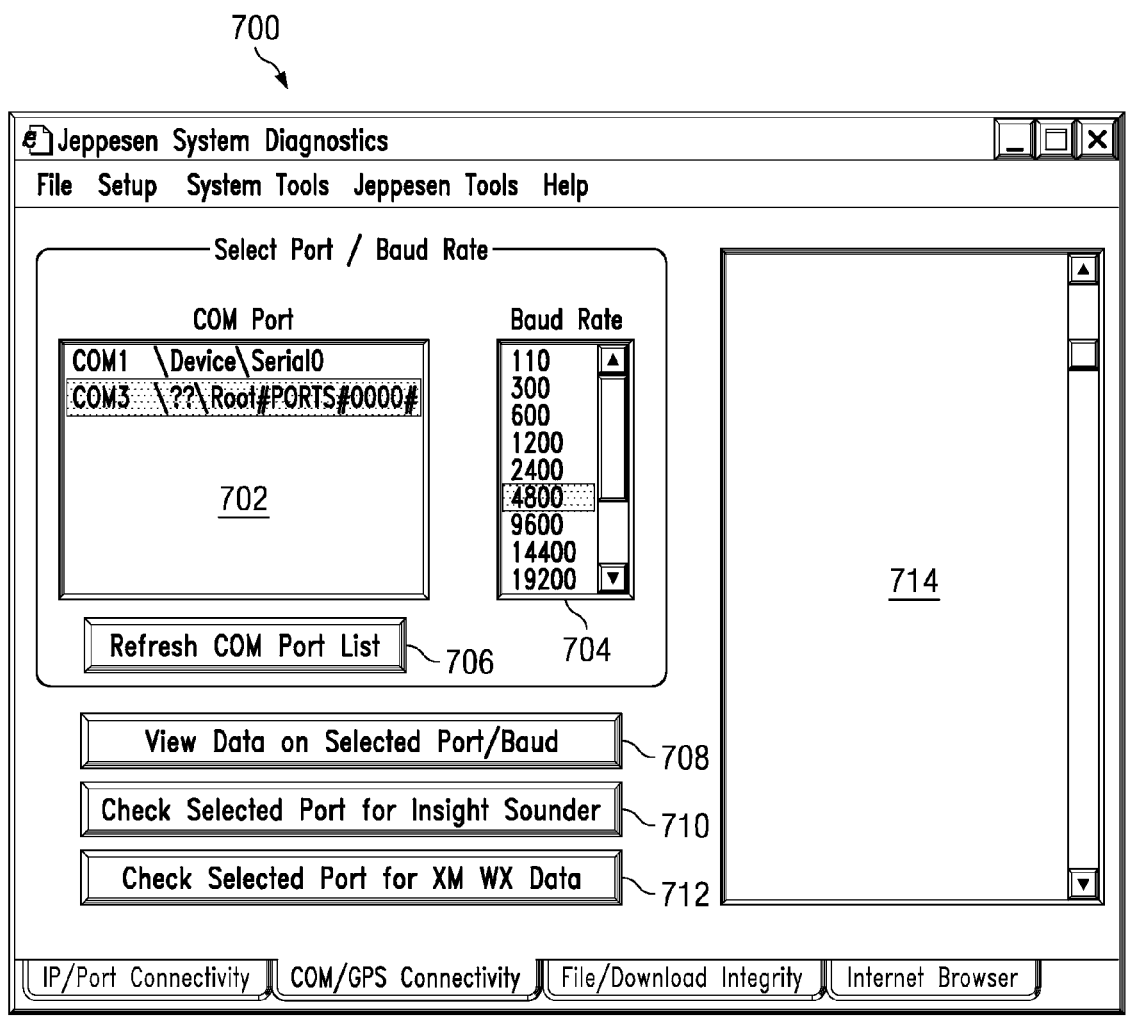
FIG. 6 is a graphic user interface identifying diagnostic functions being performed for an application in accordance with an advantageous embodiment of the present invention.
FIG. 7 is a diagram illustrating a graphical user interface for testing communications ports in accordance with an advantageous embodiment of the present invention.

Turning now to FIG. 6, a graphical user interface identifying diagnostic functions being performed for an application is depicted in accordance with an advantageous embodiment of the present invention. In this example, window 600 indicates that three types of diagnostic functions are to be performed for the selected application. In this example, port access is one set of diagnostic functions to test whether the application is able to access and generate connections through ports needed to properly function.

In this example, the port access test has been completed as indicated by graphical indicator 602. Graphical indicator 604 indicates that communications tests are halfway or 50 percent completed. Graphic indicator 606 indicates that testing of the integrity of the download for the application has not yet been performed.

Window 600 is an example of one manner in which the progress of diagnostic functions being performed on a data processing system may be presented to a customer. This example is merely illustrative and not meant to restrict the manner in which the progress of function execution may be presented. Further, the results of the performance of these diagnostic functions also may be presented through window 600. For example, with respect to the port access function, port 110 is unaccessible in this particular example. This presentation of the results is an additional feature in addition to generating a log file containing the results.

The different functions illustrated in FIGS. 7-12 are illustrative examples of diagnostic functions that may be implemented in a diagnostic utility. Of course, these depicted illustrations are not intended to limit the manner in which the diagnostic functions may be presented in a graphical user interface. Also, these examples are not meant to be limitations as to the type or number of diagnostic functions that may be provided in a diagnostic utility.

Turning now to FIG. 7, a diagram illustrating a graphical user interface for testing communications ports is depicted in accordance with an advantageous embodiment of the present invention. Window 700 is an example of a user interface that is presented for a communications functions used to test communications ports on a computer or other device. Window 700 is an example of a window that may be presented by graphical user interface 402 in FIG. 4.

In this example, section 702 identifies communications ports that may be tested. Section 704 provides a selection of communications rates that may be used for the test. Control 706 is used to refresh or identify ports on a computer or device. By selecting control 706, the system diagnostic program detects any currently active communications port on a computer or device. This port may be, for example, a serial port, a universal serial bus virtual port, or any other serial data interface port.

This type of function may be initiated when a customer is unable to obtain a valid data stream from their global positioning system receiver or weather receiver. These types of receivers are typically connected through a communications port, such as a universal serial bus virtual port. When a connection is not present, connection errors or other non-standard behavior occurs. With this type of situation, the customer may use window 700 to execute diagnostic functions to test the communications ports. The different tests may be initiated through the selection of control 708, 710, and 712 in these examples.

Control 708 is used to view data on a particular selected port at a selected data rate. This data may be viewed in section 714 in these examples. Control 710 is used to determine if an InSight™ Sounder is attached to the selected point. The Nobeltec® InSight™ Sounder is a product of Jeppesen Marine, Inc. and is a fully functional depth sounder/fishfinder that is controlled through a personal computer. Control 712 is used to determine whether XM weather data can be retrieved from the port selected for testing.

Figure 8:
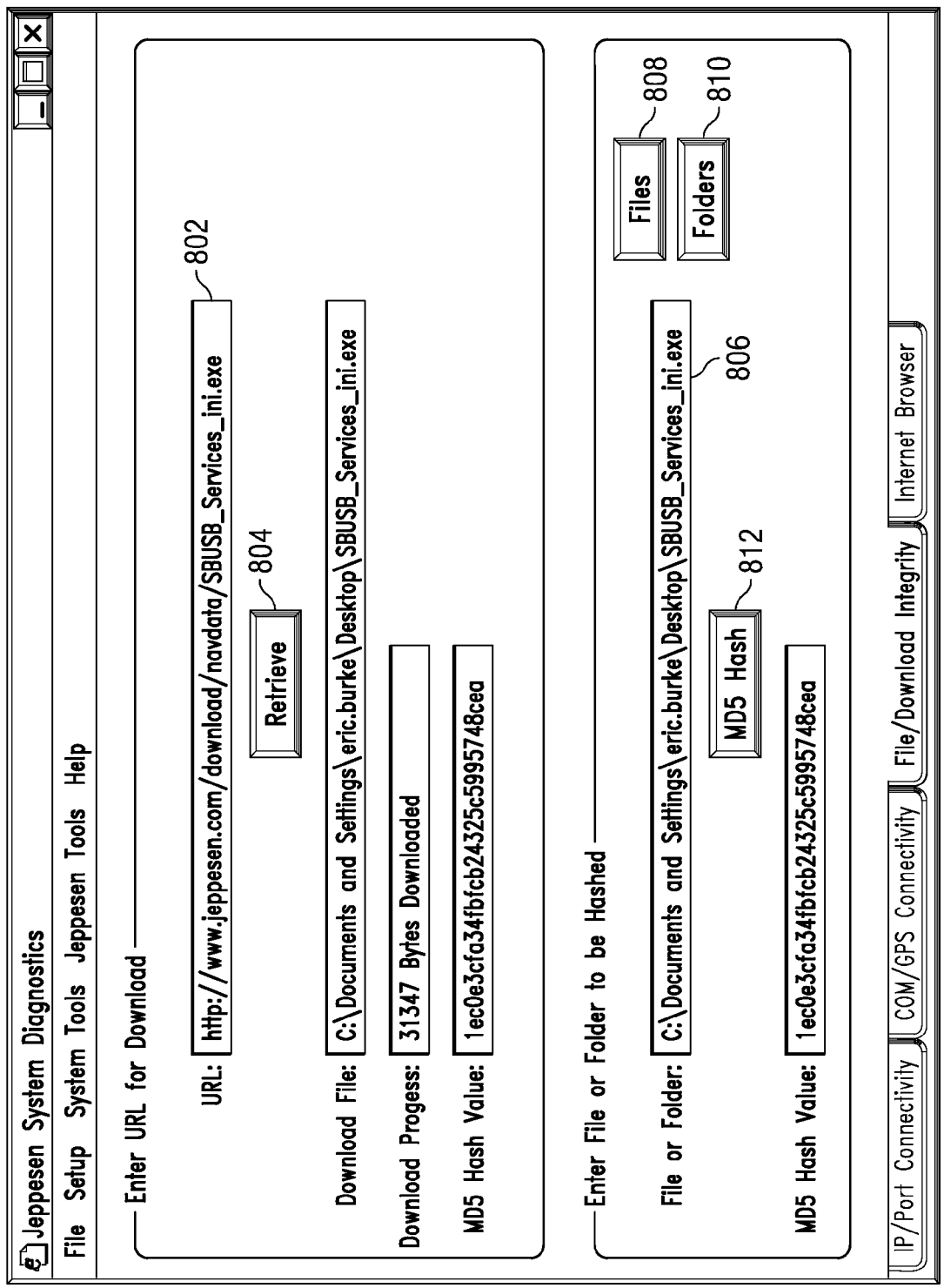
FIG. 8 is a diagram of a graphical user interface for a download integrity function in accordance with an advantageous embodiment of the present invention.

Turning now to FIG. 8, a diagram of a graphical user interface for a download integrity function is depicted in accordance with an advantageous embodiment of the present invention. Window 800 is a graphical user interface that may be employed by a customer to determine whether a file downloaded for use by an application has been corrupted or become invalid during the download process. Window 800 is an example of a window that may be presented by graphical user interface 402 in FIG. 4.

Field 802 in window 800 is used by a customer to enter a universal resource locator for the download that is to be tested. The customer may then select control 804 to retrieve the file. Thereafter, field 806 allows a customer to enter the file or folder to be tested. This path may be entered or may be selected by the customer through the use of controls 808 and 810. In this example, the location of the file selected for testing is the location of the file downloaded by the customer. The selection of control 812 initiates the test on the selected file.

In these depicted examples, the test is a hash test using message-digest algorithm 5 (MD5), which is a well known cryptographic hash function. By having the downloaded file tested using an MD5 hash test, a result is obtained which may be compared to an expected result for the file. If the hashes are different, then it is likely that interference is occurring with the download on the customer side.

Additionally, this type of test may be performed on any file or folders for the application. Through this functionality, a customer may identify files for the applications that are corrupted or invalid.

Figure 9:
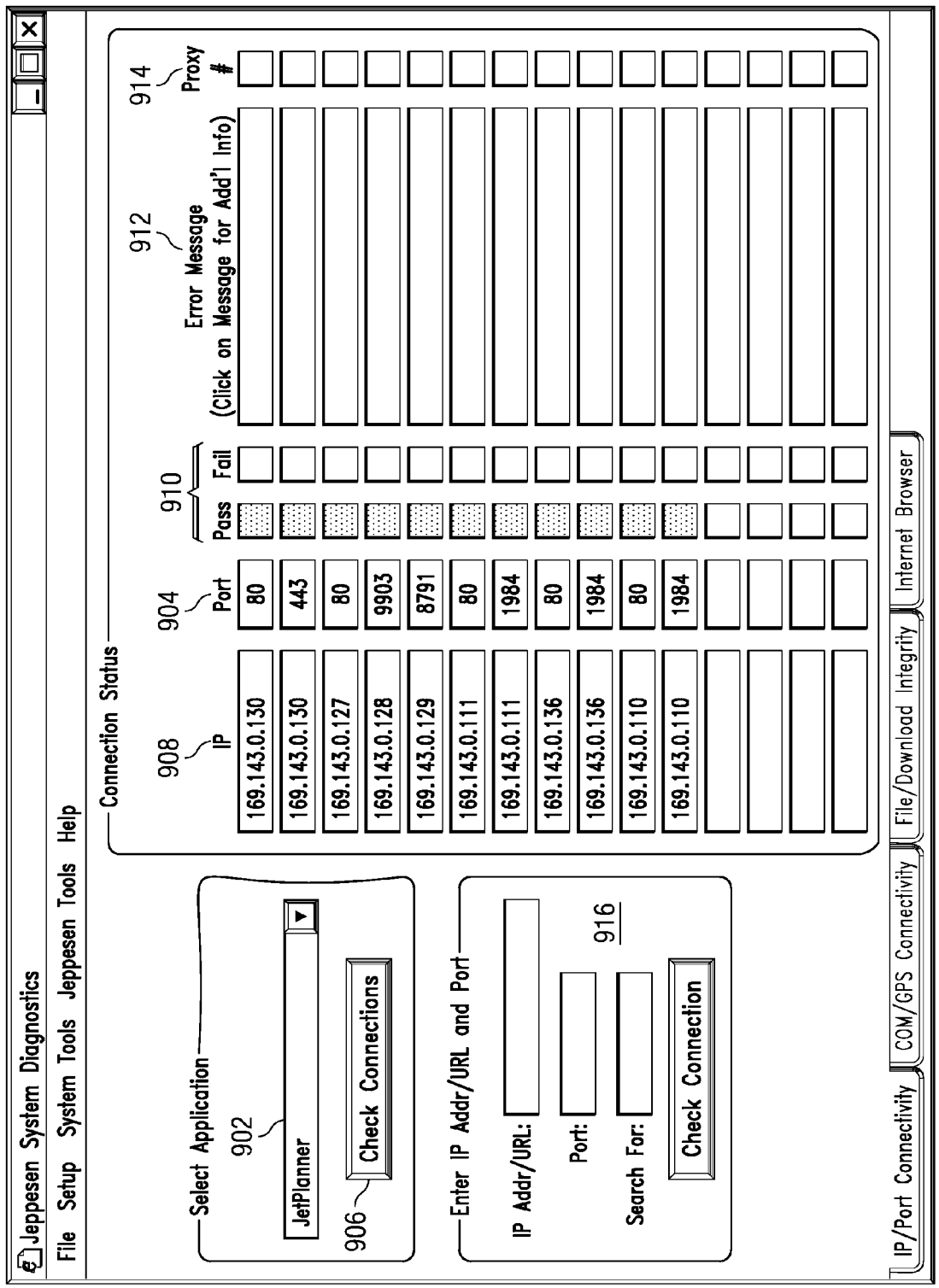
FIG. 9 is a graphical user interface for a port detection function in accordance with an advantageous embodiment of the present invention.

Turning now to FIG. 9, a graphical user interface for a port detection function is depicted in accordance with an advantageous embodiment of the present invention. In this example, window 900 illustrates a graphical user interface for detecting and testing port configurations. Window 900 may be presented using graphical user interface 402 in FIG. 4 in these illustrative embodiments.

Field 902 in window 900 is used by a customer to select an application. Field 902 may present a drop down list containing applications that may be selected by the customer in this particular example. By selecting an application in field 902, ports that are required for the particular application are presented in section 904.

A customer may select control 906 to test these ports. The Internet Protocol (IP) addresses for the different ports are identified in section 908. The IP addresses identify addresses that should be accessible or reached by the application running on the customer's computer.

Whether a particular port passes or fails the test is identified in section 910. Error messages, if any, are presented in section 912. The presence or use of proxy ports are identified in section 914.

In addition to automatically testing ports, window 900 also allows a customer to enter specific ports in section 916 for testing. The functionality presented through window 900 allows for testing whether an application is able to connect to the servers needed to properly function. Often times, the application simply does not function or does not use current critical data, such as navigation data to perform its diagnostic functions.

The functionality provided by window 900 may be used when a customer detects a problem in attempting to execute or run a program. Alternatively, this utility may be run when a potential customer or current customer is contacted to offer the customer or potential customer an opportunity to test a program. In this manner, required Internet protocol addresses in ports may be identified ahead of time to reduce problems that may occur. Further, this utility also may be used prior to the installation of a program purchased by a customer.

Figure 10:
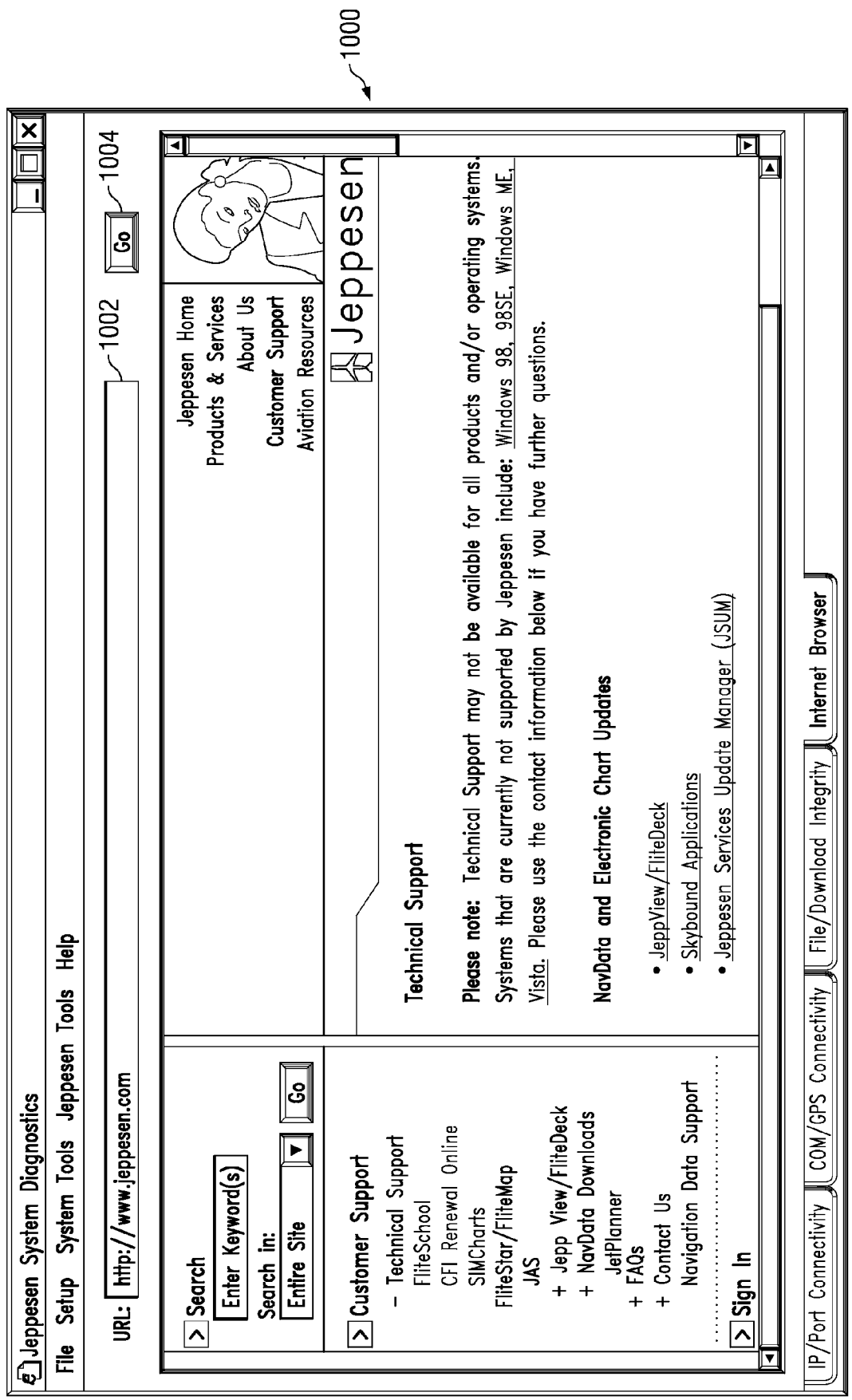
FIG. 10 is a diagram illustrating an Internet browser in accordance with an advantageous embodiment of the present invention.

Turning next to FIG. 10, a diagram illustrating an Internet browser is depicted in accordance with an advantageous embodiment of the present invention. Window 1000 may be presented using graphical user interface 402 in FIG. 4. Window 1000 provides an Internet browser with basic diagnostic functions. This browser allows a customer to enter a universal resource locator in field 1002 and retrieve a web page using control 1004. In this manner, the customer is now required to leave the system diagnostic utility to obtain files or data needed to perform the system diagnostic.

Figure 11:
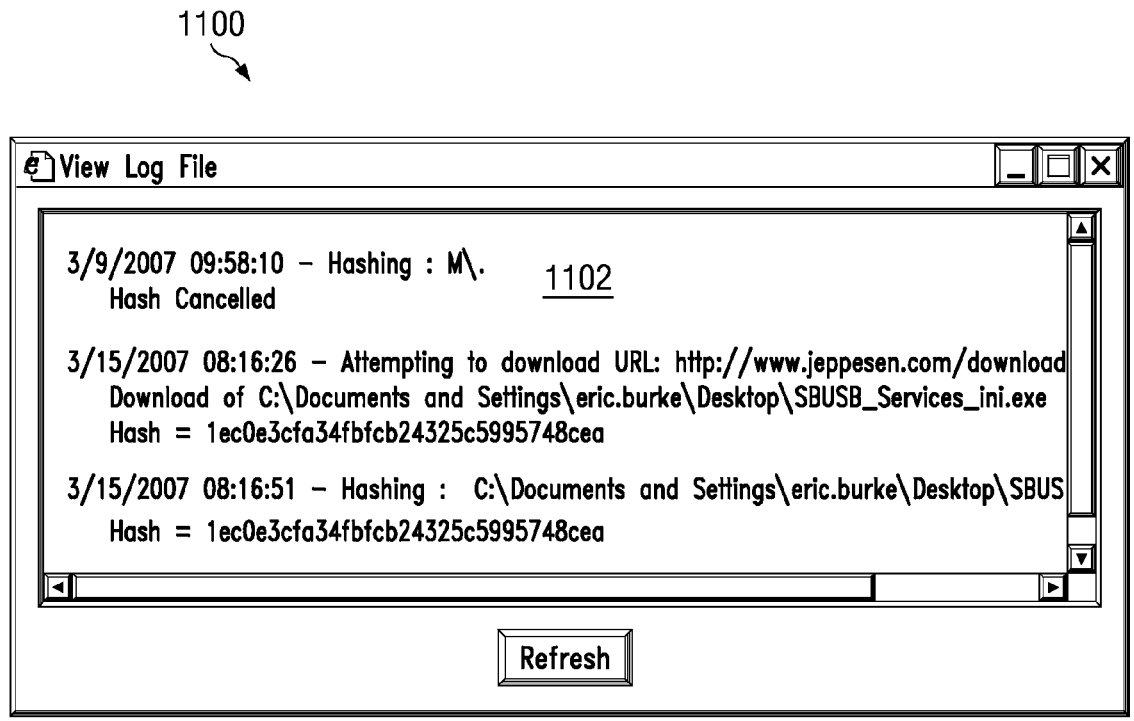
FIG. 11 is a diagram illustrating a presentation of a log file in accordance with an advantageous embodiment of the present invention.

With reference now to FIG. 11, a diagram illustrating a presentation of a log file is depicted in accordance with an advantageous embodiment of the present invention. Window 1100 is an example of a window presented by graphical user interface 402 in FIG. 4 in these examples. Window 1100 allows a customer to view a log file of the diagnostic functions performed. The different entries are illustrated in section 1102 in these examples.

This log file contains all of the actions of the customer and the results of those actions. This log file may then be sent to technical support if needed for additional troubleshooting. This type of data is invaluable when troubleshooting with a customer that has a low level of technical expertise. A log file, such as the one illustrated in window 1100, may reduce the time needed to find a resolution to problems in an application executing at a customer site.

Figure 12:
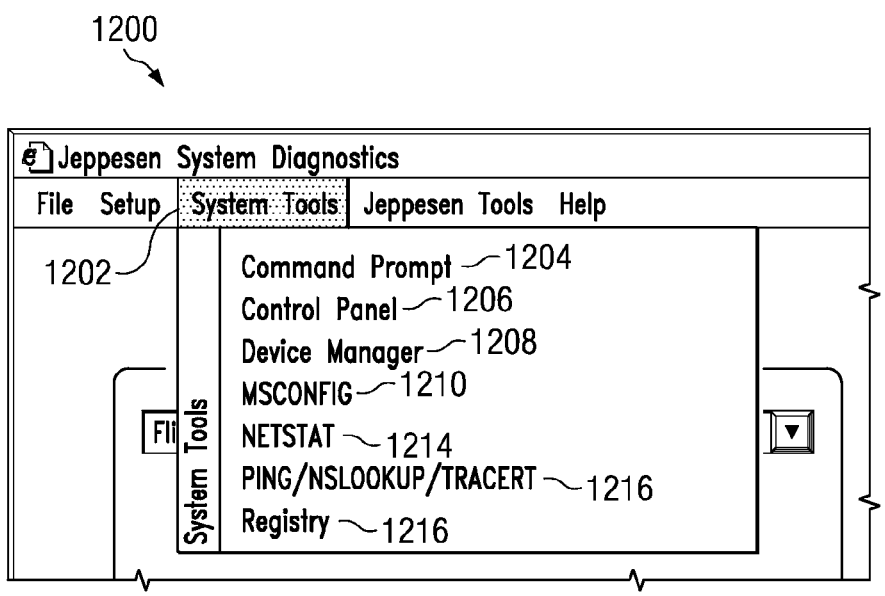
FIG. 12 is a diagram illustrating a graphical user interface providing access to diagnostic tools in accordance with an advantageous embodiment of the present invention.

Turning now to FIG. 12, a diagram illustrating a graphical user interface providing access to diagnostic tools is depicted in accordance with an advantageous embodiment of the present invention. Window 1200 may be presented using graphical user interface 402 in FIG. 4. Window 1200 contains drop down menu 1202, which provides access to system tools. In these examples, the system tools are those present in the operating system. The system tools may include, for example, command prompt 1204, control panel 1206, device manager 1208, MSCONFIG 1210, NETSTAT 1214, Ping/NSLOOKUP/TRACERT 1216, and Registry 1218. Of course, the types of system tools accessible differ depending on the different operating system on which the system diagnostic is executing. In this manner, a customer is provided access to other diagnostic utilities that may be needed without having to open up new applications or interfaces to access those tools and without the further need to learn how to properly configure and run these applications.

Figure 13:
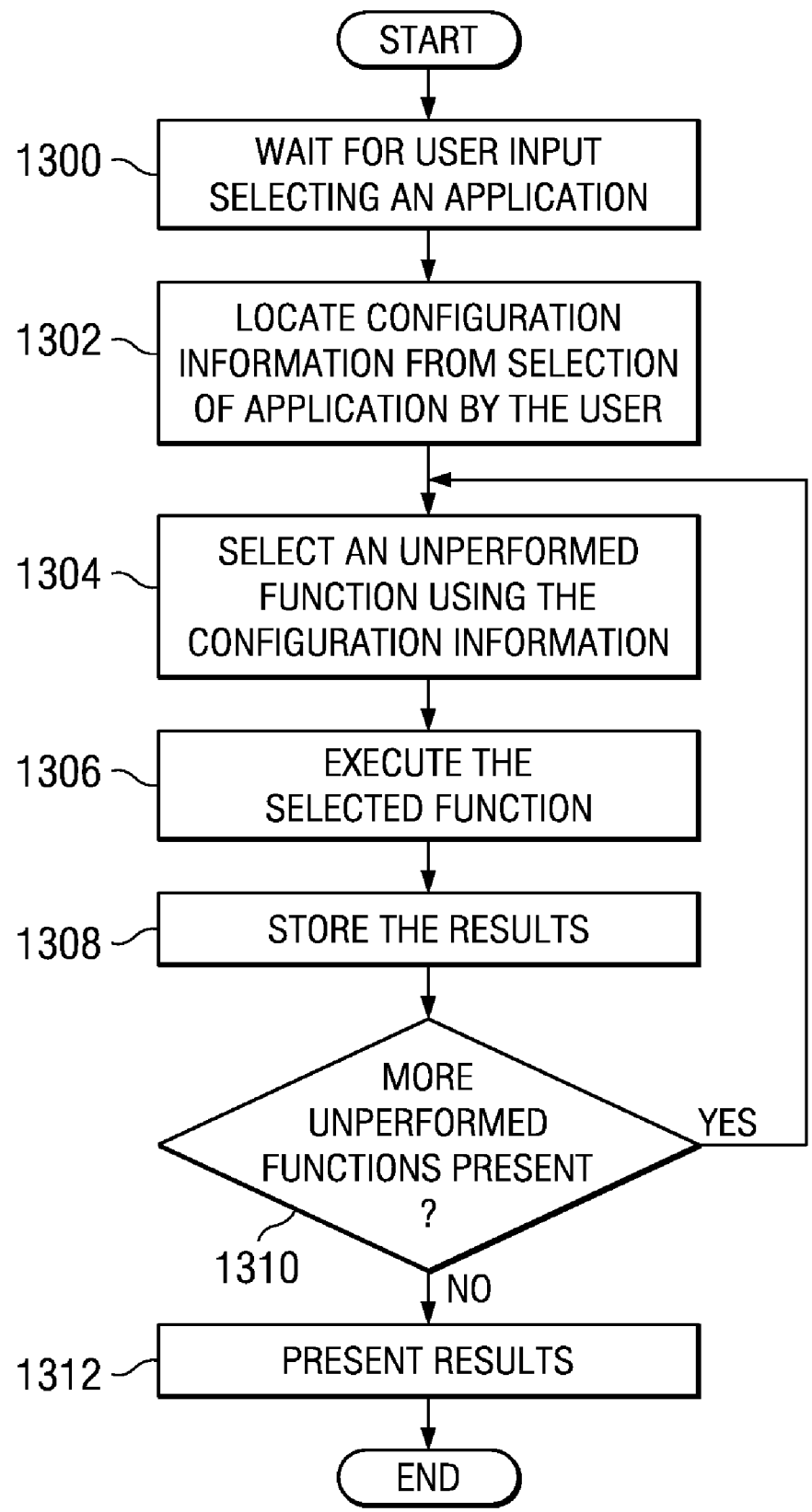
FIG. 13 is a flowchart of a process for testing an application using a set of diagnostic functions in accordance with an advantageous embodiment of the present invention.

Turning now to FIG. 13, a flowchart of a process for testing an application using a set of diagnostic functions is depicted in accordance with an advantageous embodiment of the present invention. The process illustrated in FIG. 13 may be implemented in a program, such as system diagnostic utility 400 in FIG. 4.

The process begins by waiting for user input selecting an application (operation 1300). Once user input selecting an application has been entered, configuration information for the application is identified from the selection made by the user (operation 1302). Thereafter, an unperformed function is selected using the configuration information (operation 1304). In these examples, the particular diagnostic functions that are to be performed with respect to an application may be identified in the configuration information. Thereafter, the selected function is executed (operation 1306). Next, the results are stored (operation 1308).

Thereafter, a determination is made as to whether additional unperformed diagnostic functions are present (operation 1310). If additional unperformed diagnostic functions are present, the process returns to operation 1304 to select another unperformed function. If additional unperformed diagnostic functions are not present, the process presents the results (operation 1312) with the process terminating thereafter.

The flowcharts and block diagrams in the different depicted embodiments illustrate the architecture, functionality, and operation of some possible implementations of apparatuses, methods and computer program products. In this regard, each block in the flowchart or block diagrams may represent a module, segment, or portion of code, which comprises one or more executable instructions for implementing the specified function or functions.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer usable program code for diagnostic testing of systems on which an application is located. Responsive to receiving a selection of the application, a plurality of diagnostic functions is identified to perform using configuration information associated with the application to form identified diagnostic functions. The identified diagnostic functions are executed to test an ability of the application to properly function within an operating environment for the application.

The description of the present invention has been presented for purposes of illustration and description and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for performing diagnostic testing for an application executing on a computer, the computer implemented method comprising:

executing a diagnostic utility on the computer, wherein the diagnostic utility includes a graphical user interface and a plurality of diagnostic functions, wherein the graphical user interface is configured to allow users to run diagnostics needed to troubleshoot the application;

receiving a selection of the application executing on the computer for diagnostic testing through the graphical user interface;

responsive to receiving the selection of the application, identifying a set of diagnostic functions from the plurality of diagnostic functions to test at least one of connectivity, operation of the application, and a presence of a set of needed files by the application to form a set of identified diagnostic functions, wherein the connectivity includes at least one of an ability to access a set of ports controlled by a firewall, an ability to connect to an Internet protocol address, an ability to access a set of communications ports, and an ability to access a universal resource locator, wherein the set of needed files includes a dynamic link library, wherein the set of identified diagnostic functions are identified using configuration information for the application, wherein the configuration information is located in a registry entry for the application, wherein the configuration information identifies resources that the application needs to access, and wherein the resources include at least one of a set of ports in a firewall, a server that provides data to the application, and a set of communications ports;

selecting an unperformed function using the configuration information;

executing the set of identified diagnostic functions with respect to the unperformed function, wherein a result is generated; and presenting a result from executing the set of diagnostic functions using the graphical user interface.

2. The computer implemented method of claim 1 further comprising:

saving the result from executing the set of diagnostic functions in a log file.

3. The computer implemented method of claim 2 wherein the log file is written to at least one of a file, database, and a diagnostic storage system, wherein the diagnostic storage system is connected to the computer by a wireless communications link.

4. The computer implemented method of claim 1 further comprising:
receiving the diagnostic utility at the computer from a third party in response to a request for assistance with the application.

5. The computer implemented method of claim 1, wherein the set of diagnostic functions includes testing an ability of the application to connect to a server through selected ports.

6. The computer implemented method of claim 1, wherein the set of diagnostic functions includes testing an ability of the application to access a device connected to a communications port.

7. The computer implemented method of claim 1, wherein the result comprises results from each diagnostic function executed in the set of identified diagnostic functions.

8. A computer implemented method for performing diagnostic testing, the computer implemented method comprising:
receiving a selection of an application for diagnostic testing, wherein the graphical user interface is configured to allow users to run diagnostics needed to troubleshoot the application;
responsive to receiving the selection of the application, identifying a plurality of diagnostic functions to test at least one of connectivity, operation of the application, and a presence of a set of needed files by the application to form a set of identified diagnostic functions, wherein the connectivity includes at least one of an ability to access a set of ports controlled by a firewall, an ability to connect to an Internet protocol address, an ability to access a set of communications ports, and an ability to access a universal resource locator, wherein the set of needed files includes a dynamic link library, wherein the set of identified diagnostic functions are identified using configuration information associated with the application, wherein the configuration information is located in a registry entry for the application, wherein the configuration information identifies resources that the application needs to access, and wherein the resources include at least one of a set of ports in a firewall, a server that provides data to the application, and a set of communications ports;
selecting an unperformed function using the configuration information; and
executing the identified diagnostic functions with respect to the unperformed function using the configuration information to test a correctness of a set of parameters needed by the application to properly function within an operating environment.

9. The computer implemented method of claim 8, wherein the operating environment comprises a data processing system on which the application is executing and a network to which the data processing system is connected.

10. The computer implemented method of claim 8 further comprising:
presenting results from executing the identified diagnostic functions.

11. The computer implemented method of claim 8, wherein identifying and executing steps are performed by a diagnostic utility.

12. A computer program product comprising:
a computer usable medium having computer usable program code for performing diagnostic testing for an application executing on a computer, the computer program product comprising:
computer usable program code for executing a diagnostic utility on the computer, wherein the diagnostic utility includes a graphical user interface and a plurality of diagnostic functions, wherein the graphical user interface is configured to allow users to run diagnostics needed to troubleshoot the application;
computer usable program code for receiving a selection of the application executing on the computer for diagnostic testing through the graphical user interface;
computer usable program code, responsive to receiving the selection of the application, for identifying a set of diagnostic functions from the plurality of diagnostic functions to test at least one of connectivity, operation of the application, and a presence of a set of needed files by the application to form a set of identified diagnostic functions, wherein the connectivity includes at least one of an ability to access a set of ports controlled by a firewall, an ability to connect to an Internet protocol address, an ability to access a set of communications ports, and an ability to access a universal resource locator, wherein the set of needed files includes a dynamic link library, wherein the set of identified diagnostic functions are identified using configuration information for the application, wherein the configuration information is located in a registry entry for the application, wherein the configuration information identifies resources that the application needs to access, and wherein the resources include at least one of a set of ports in a firewall, a server that provides data to the application, and a set of communications ports;
computer usable program code for selecting an unperformed function using the configuration information;
computer usable program code for executing the set of identified diagnostic functions with respect to the unperformed function using the configuration information, wherein a result is generated; and
computer usable program code for presenting a result from executing the set of diagnostic functions using the graphical user interface.

13. The computer program product of claim 12 further comprising:
computer usable program code for saving the result from executing the set of diagnostic functions in a log file.

14. The computer program product of claim 12 further comprising:
computer usable program code for sending the diagnostic utility to the computer in response to a request for assistance with the application.

* * * * *